United States Patent [19]
Anderson, Jr. et al.

[11] 3,831,140
[45] Aug. 20, 1974

[54] ELECTRICAL INTERLOCKING SAFETY BELT SYSTEM

[76] Inventors: William W. Anderson, Jr., 26 Western Rd., Newport News, Va. 23601; Ray M. Burcher, Box 107, Rt. 2, Grafton, Va. 23490

[22] Filed: June 7, 1972

[21] Appl. No.: 260,469

[52] U.S. Cl...........340/52 E, 340/278, 307/10 SB, 180/82 C
[51] Int. Cl............................................ B60r 25/10
[58] Field of Search................... 340/52 E, 53, 278; 307/10 SB; 180/82 C

[56] References Cited
UNITED STATES PATENTS

| 3,506,083 | 4/1970 | Botnick et al. | 180/82 C |
| 3,718,902 | 2/1973 | Pearsall | 340/52 E |

*Primary Examiner*—Alvin H. Waring
*Attorney, Agent, or Firm*—Dennison, Dennison, Townshend & Meserole

[57] ABSTRACT

An electrically operated personal safety system for vehicles which makes the use of seat belts, including shoulder belts, mandatory in order to obtain full use of the related vehicles.

10 Claims, 10 Drawing Figures

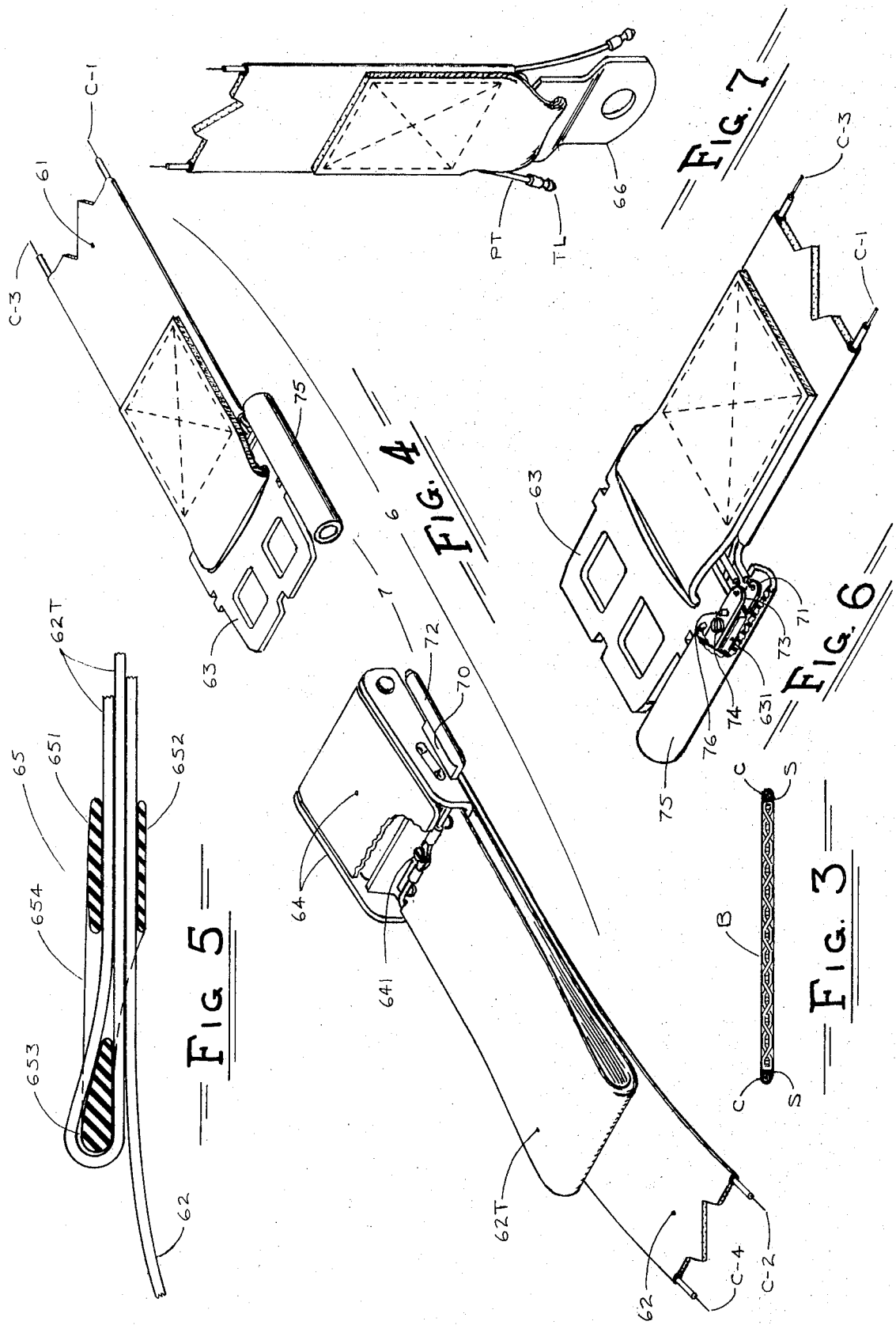

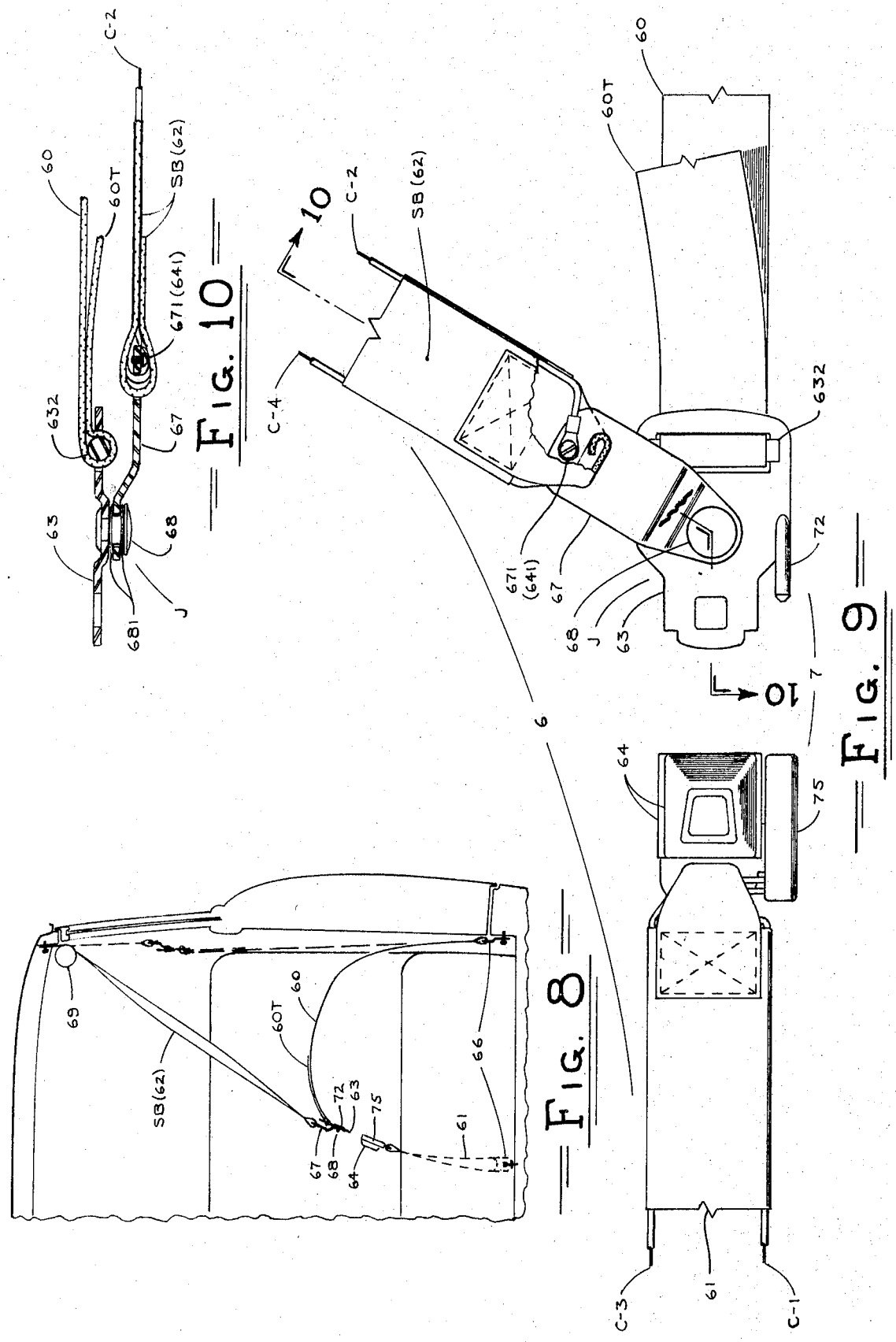

ELECTRICAL INTERLOCKING SAFETY BELT SYSTEM

The general object of this invention is to extend the protective capability of existing seat belt systems such that the improved systems can be classified as being truly "active protective systems" rather than being merely "voluntary protective systems" as the present ones must rightfully be classified.

References
United States Patents

| | | |
|---|---|---|
| 3,133,277 | Hood | May 12, 1964 |
| 3,340,523 | Whitman | September 5, 1967 |
| 3,437,933 | Recio | April 8, 1969 |
| 3,438,455 | Redmond | April 15, 1969 |
| 3,449,714 | Farley | June 10, 1969 |
| 3,455,410 | Wilson | July 15, 1969 |
| 3,462,732 | Griffin | August 19, 1967 |
| 3,570,621 | Hampton | March 16, 1971 |

BACKGROUND AND SUMMARY OF THE INVENTION

In a summary sense all existing seat belt monitoring and control systems fall into one of three categories, namely: (1) Warning only; (2) starting control only; and (3) starting and running control. The protection offered by systems of the first category obviously rests on the significance assigned by the observers to the warning given. Similarly, the protection offered by systems of the second category rests with the confidence that the user assigns to the use of seat belts, over and above that prompted by the "no fasten, no start" feature of the system. While systems of the third category would seemingly provide the ultimate in passenger safety, experience has shown that these systems create new problems. More specifically, in automotive applications, the running portection provided invariably involves interrupting the engine ignition system causing the related vehicle to be left powerless, with or without some time delay, and without adequate warning to other persons in the proximity of the vehicle. If this interruption occurs when operating the vehicle at high speed, it obviously presents a serious hazard to everyone in the vicinity. Because of this, and the general nuisance of fastening seat belts, many operators have circumvented the primary purpose of these systems by either fastening the belts prior to a given occupancy and subsequently riding on the belts rather than in them, or simply withdrawing the belt from the retractor and laying it aside, depending on the type of system involved.

Thus, the principal object of the present invention is to devise a simple, but positive and novel means to deny the occupants of a vehicle normal use of the said vehicle unless the said occupants (1) fasten their individual seat belts on and after each occupancy of the said vehicle and (2) continue to retain their respective seat belts in the fastened condition throughout the course of travel; it being further qualified that the normal dangers of travel will not be markedly increased in event that any occupant of the said vehicle fails to confine himself to the protective envelope afforded him by his seat belt.

More specifically each of the following requirements constitutes an object of the present invention.

1. Preclude the possiblity of initially starting the engine of any vehicle under normal circumstances unless the operator and each passenger fastens his seat belt after occupying their respective seats.

2. Provide full access to normal use of the vehicle, on condition that the operator and each passenger continues to retain his seat belt fastened. This includes the capability to restart the engine in event of stalling, the said capability being made available without delay or the need to manipulate any other device.

3. Limit the speed of a vehicle to some nominally slow speed, say 20 m.p.h. for automobiles and trucks, in event that the operator or any passenger unfastens his seat belt after the engine has been started, or fails to fasten his seat belt on occupying the vehicle after the engine has been started.

4. Cause an emergency warning signal to be automatically displayed external to the vehicle, whenever the said vehicle is slowed as specified above.

5. Preclude the possibility of restarting the engine in the event of stalling, when the vehicle is slowed as outlined above.

6. Provide the operator with the capability to resume speed, restarting the engine if necessary, when the offending occupant has refastened his seat belt, both of the said capabilities being made available without further delay, or the need to manipulate any other device.

7. Preclude the possibility of easily sidestepping any of the foregoing requirements or limitations by means of operating one or more extraneous switches, fastening one or more seat belts prior to occupancy, or simply withdrawing one or more belt sections from their respective retractors without actually fastening the said sections to their mating ends, over and about the occupants which they are intended to protect.

The foregoing objects may be readily satisfied by assigning primary control of the conventional starting and ignition or power distribution and control systems of a vehicle to a double acting electrical interlock control system, and extending the function of this new system to operate a speed governing device in collaboration with an external emergency warning signal system (such as the four-way flasher system installed on all new automobiles) in event that any seat belt is unfastened after the engine or power control system of the related vehicle has been started. Physically, this is achieved by equipping each seat, or seat space which is included in the system, with two sets of double acting seat operated switches, a set of seat belts modified to carry a double acting interlock control circuit, and a rotary stepping switch or relay, all of which are interconnected to each other, a master control relay, a condition display, the governor, and the existing systems named above to provide the control functions sought, as explained below.

Suffice it here to note that while the following specifications and accompanying drawings describe the application of this invention to automotive vehicles, powered by internal combustion engines, such description is for illustrative purposes only, and the principles disclosed may be applied to all types of manned vehicles to provide positive control of any number of functions which are pertinent to the safety of the personnel, and the cargo, or equipment involved.

BRIEF DESCRIPTION OF THE DRAWINGS

FIG. 3 is an orthogonal sectional view of a conventional seat belt strap, modified to carry two insulated electrical conductors for the purposes disclosed herewith.

FIG. 4 is a perspective drawing of the buckle section of a set of conventional buckle-adjusted seat belts, modified to carry the buckle interlock disclosed herewith.

FIG. 5 is an orthogonal sectional view of a friction clip which serves to hold the belt adjusting loop shown in FIG. 4 flat against the load carrying section of the belt.

FIG. 6 is a perspective drawing of the buckle tongue, modified to carry the interlock jack, showing the details of its construction.

FIG. 7 is a perspective drawing of the anchor section of a set of conventional seat belts showing the details of terminating the conductors extended from the buckle interlock noted above.

FIG. 8 is a fragmentary view of an automobile body, showing the means to install a set of lap and shoulder belts modified as required to make the use of shoulder belts more convenient, if not mandatory.

FIG. 9 is a fragmentary section of FIG. 8 showing the details of a new buckle arrangement devised to make the use of lap and shoulder belts mandatory.

FIG. 10 is an orthogonal sectional view of FIG. 9 showing the details of constructing the pivot and the means of connecting the conductors to the clevis plate.

CONSTRUCTION AND OPERATION OF THE SYSTEM

Figure 1:
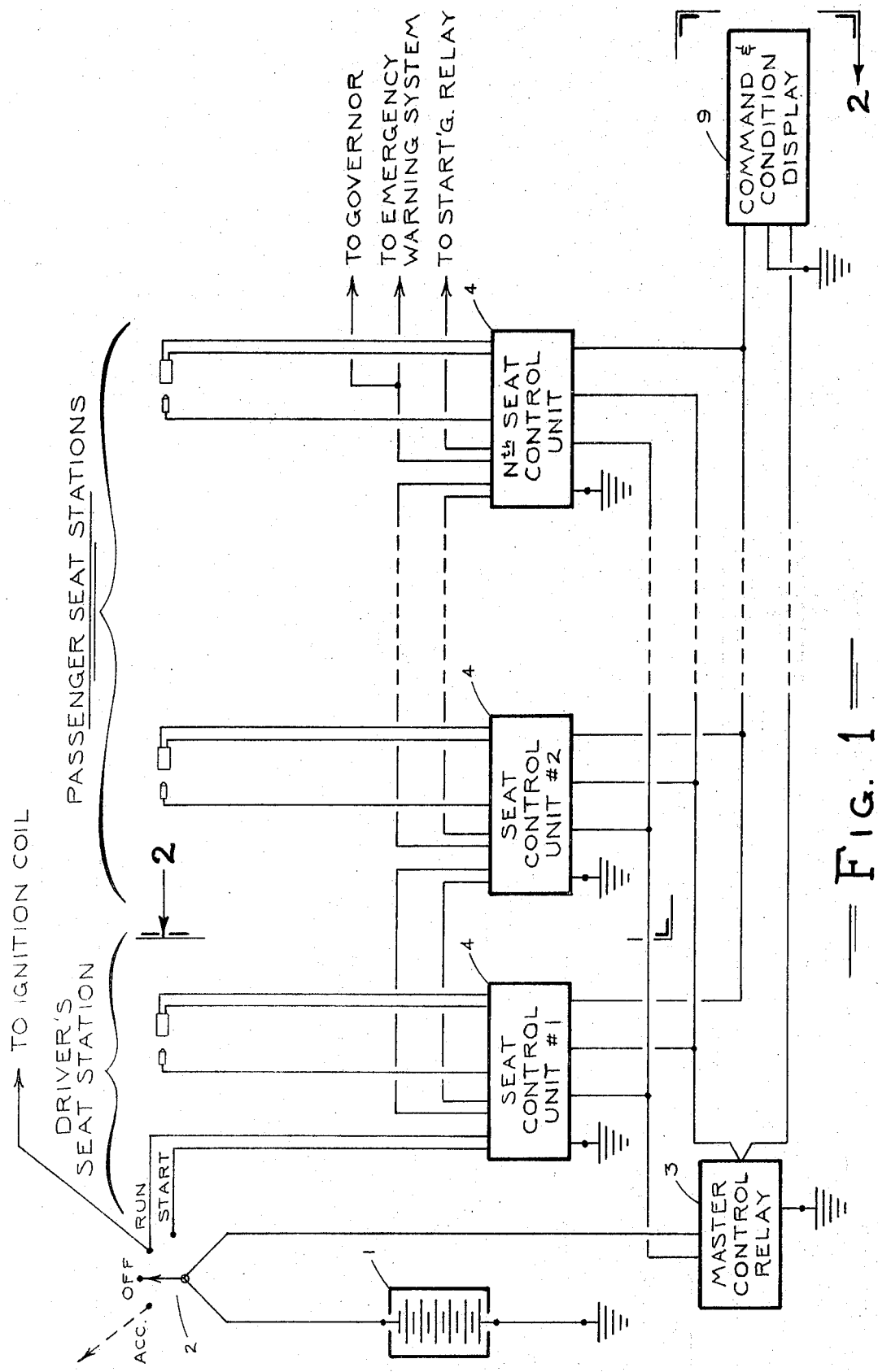
FIG. 1 is a block wiring diagram of the interlocking control system disclosed herewith, showing the means to interpose the system between the various support and control systems which are commonly found on present day automobiles and trucks.
Figure 2:
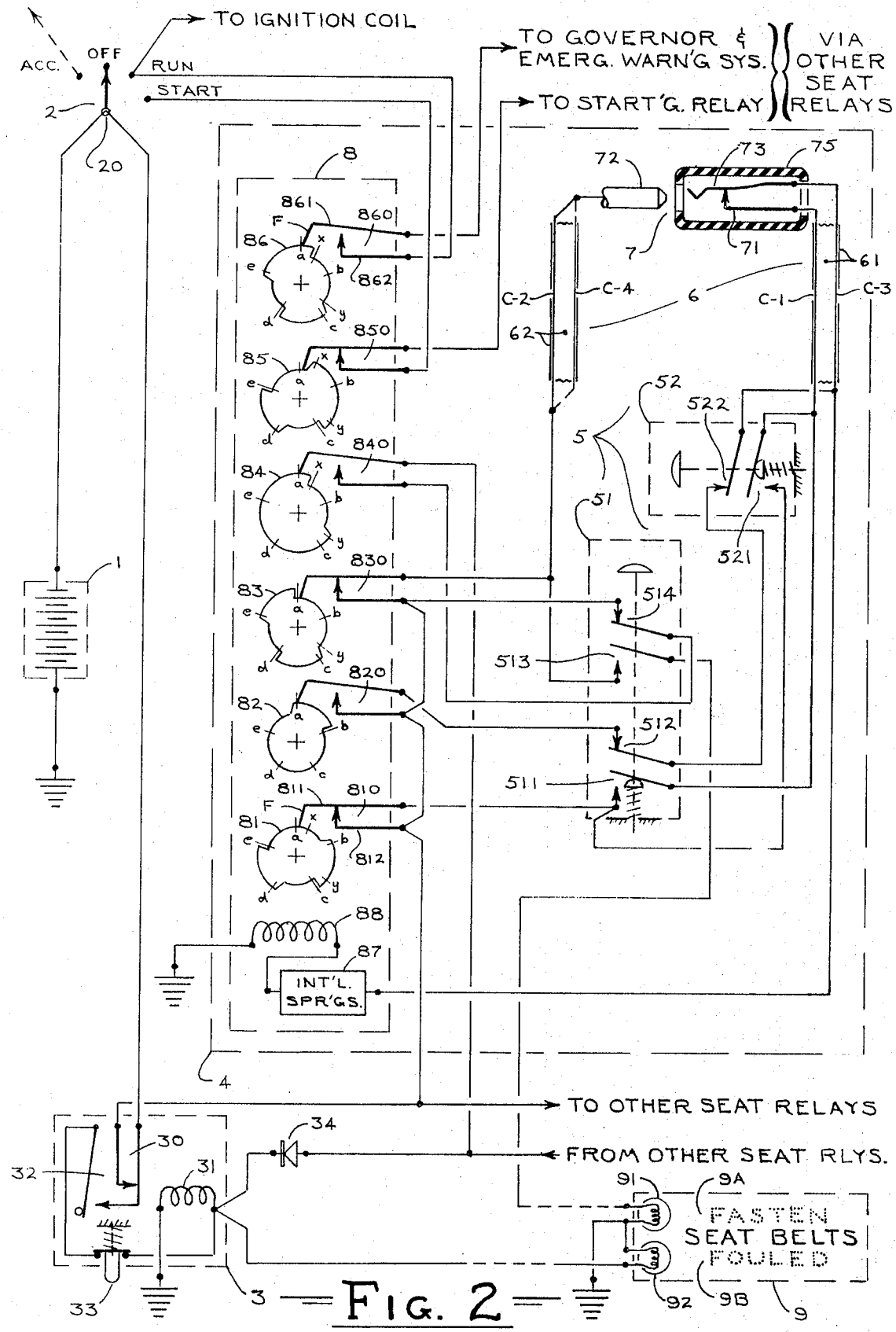
FIG. 2 is a schematic diagram of the aforesaid system showing the details of the master control relay and a typical seat station control unit installed at the driver's seat station.

As shown on FIGS. 1 and 2, the system is comprised of a master control relay 3, one or more seat control units 4, a command and condition display 9, and the circuitry required to connect these various units to each other and the power source or battery 1. Further examination of these drawings will show that the system is arranged to control the operation of the existing engine starting and emergency warning systems, in collaboration with a conventional speed control governor, in a novel manner, such that the occupant of each controlled seat space will be compelled to wear his seat belt, or be denied normal use of the vehicle, as will be fully explained later. Presently, it is more important to explain those elements and modifications which are fundamental to obtaining the control functions sought.

Turning now to FIG. 1 with particular reference being made to the details shown on FIG. 2, it will be seen that the master control relay 3 is a self-holding device, which holds the master cut-out switch 30 open by virtue of the closing of contact 32, whenever the coil 31 is energized by the current passed to it from any one of the seat control units 4. Obviously, in event that one of the many ready-made relays is not suitable for a particular application, a special one could easily be made as required using a variety of standard parts.

In contrast to the simplicity of the foregoing, it will be observed that the seat control units 4 are comprised of several devices. More specifically, each seat control unit consists of two sets of seat operated switches, extended from prior art and generally referred to as the seat switches 5; a set of seat belts 6 which are modified to carry a buckle interlock switch 7; a rotary stepping switch, hereinafter referred to as a relay 8; and the circuitry required to connect these devices to each other as shown on the diagram.

Reference is now made to FIG. 3 which shows the means to modify the web-like strapping ordinarily used for seat belts to carry two single, flexible and insulated conductors along the length of the strapping. More specifically, the conductors C are bound to the opposite edge faces of the strap B with flexible shrouds S which are either molded or crimped to the body of the strap. Because the conductors and shrouds are flexible, and because they are bound to the strap in the plane of maximum flexure, it will be apparent that the wired strapping may be used in the conventional manner with little, if any, added flexural stiffness.

It will be understood that the details of the seat belt buckles were purposely omitted from FIGS. 1 and 2 as a means of promoting the clarity and versatility of these drawings. Nevertheless, it will be understood that the interlock plug 72 is attached to one of the said buckle fittings, and the socket 75, complete wich switch springs 71 and 73, is attached to the mating buckle fitting.

Observing that the aforesaid buckle interlock is a specialty item which also necessarily involves modifying all elements of the related seat belts, it is evident that the present invention offers a degree of novelty that more than justifies using the concept. Moreover, the gravity of this need is further compounded by the fact that the electrical functions of the proposed interlock reduce to that of a three pole transfer switch. Obviously, this promotes the idea of replacing the single pole switches used in the several existing interlock systems with a unitized three pole switch, and adapting the hybrid seat belt assemblies thus produced to the remainder of the proposed interlock control system disclosed herewith. Attractive as this idea might first appear to be, it will be observed that the hybrid arrangements could be duped just as easily as the parent ones may be. More specifically, the substitute switches could be easily set to the "buckled" position without actually fastening the related belt sections together. Realizing that it is impossible to fool a feed-through type interlock in the same manner, the merit of the proposed concept becomes quite evident. Significant as this is from an academic point of view, the fact remains that the true value of the concept rests on finding a simple means to either modify existing seat belt designs or develop totally new ones.

Referring back to FIG. 2 it will be observed that the plug 72 is a single conductor device, whereas the socket or jack 75 is a two conductor device. From this it follows that the real key to modifying both types of conventional belt assemblies rests on securing the interlock plug to that buckle fitting which heads up the adjustable belt section 62.

From the foregoing it will be apparent that an ordinary set of retractor adjusted lap belts could be easily modified to carry the interlock specified by using the wired strapping described above, and connecting one or both wires (C-2 and C-4) extended from the plug 72 to a single slip ring commutator affixed to the retractor drum. Because the remaining details are either self evident, or will be made apparent by that which follows, no further explanation of them will be given here.

FIG. 4 shows some of the details pertinent to modifying an ordinary set of buckle adjusted lap belts to carry the aforesaid interlock. More specifically, the plug 72 is permanently affixed to the clasp 64 by means of a conductive stand-off 70 which is sized and positioned so as to center the plug with respect to the jack 75 when the buckle tongue 63 and clasp 64 are properly aligned for fastening in the usual manner. Accordingly, the required electrical feed-through capability can be easily obtained by doubling the adjusting tail 62T back on itself, so that the normally free end of the belt and one or both of the conductors (C-2 and C-4) carried by it can be anchored to the back of the clasp as shown on the drawing.

As a means of avoiding the aggravation and criticism that would surely result from letting the aforesaid loop swing freely from the clasp, as shown in FIG. 4, it will be evident that it should be held down against the standing section of the belt 62 with a friction clip 65 such as that shown in FIG. 5. More specifically, the clip 65 consists of two retainer plates 651 and 652 and a faired separator bar 653, all of which are held parallel to each other by being end-fixed between two side guideplates 654. Logically, all of these elements should be sized and separated from each other as required to allow the clip to be adjusted with little effort, and still provide sufficient friction to hold the clip, and thus the belt sections, in place after the clip has been set as shown on the drawing. For practical as well as aesthetic reasons, the faired separator bar 653 should be sized to provide that minimum radius which will protect the wires carried by the belt from being deformed or crimped. Obviously, this accessory item was omitted from FIG. 4 to clarify that drawing, as well as to emphasize the need for the clip.

The jack 75, shown in FIG. 4, is made up and affixed to the buckle tongue as shown in FIG. 6. More specifically, standard leaf type switch springs, 71 and 73, are mounted on a support arm 631 extended from the buckle tongue 63, in such a manner that the springs are insulated from the support arm and each other in way of the support arm. Then, after the belt wires C-1 and C-3 are secured respectively to the terminal ends of the switch springs 71 and 73, the protective shroud 75 is drawn over the switch assembly and held there, either with detents 76 working in grooves 77 cut in the bore of the shroud, or by filling the wired end cavity with potting compound.

From the foregoing it will also be evident that the modified assemblies lend themselves to being applied and used in keeping with present day conventions and practices. Significant as this might be it will also be observed that the modified retractor adjusted assemblies lack the capability to compel the use of the shoulder belts which are customarily related to these assemblies. While this deficiency could be easily resolved by permanently affixing the shoulder belt to the lap belt section extended from the floor mounted retractor, it will be apparent that this modification would not resolve those deficiencies which presently preclude the general use of existing shoulder belts. An analysis of these deficiencies fostered the novel arrangements shown in FIGS. 8, 9, and 10.

Before taking up FIGS. 8, 9, and 10, it should be explained that the numbers used to denote the elements of the two lap belt assemblies previously described will be used again whenever possible, in order to maintain the same relationship wherever possible between the three arrangements. When this is not possible a new designation will be assigned, and the number assigned to the corresponding element on the preceding arrangement will be noted in parenthesis.

Aside from the buckle interlock previously described, FIG. 8 shows that the principal difference between the present invention and existing ones rests with extending each shoulder belt SB from an impulse type retractor unit 69 mounted overhead, and permanently affixing this belt to the adjacent lap belt section 60 with the new buckle fittings 63, 67, and 68 shown on FIGS. 9 and 10. Clearly then, this arrangement eliminates the objections related to the use of manually adjusted shoulder belts, and manually adjusted lap belts as well. More importantly, it will be seen that when this new arrangement is intermarried with the interlock system disclosed herewith, the use of both lap and shoulder belts will become mandatory.

As shown in FIG. 9, the elements of the buckle interlock 7 are mounted on the buckle fittings (63 and 64) in keeping with the general rule previously given for the location of these parts. While this arrangement is just the opposite of that previously described for the buckle adjusted lap belts, shown on FIGS. 4 and 6, their similarity is evident from the description thus far and precludes the need for any greater detail.

Suffice it here to note that the adjustable leg 60 (FIG. 9) of the lap belt could be made to carry conductors C-2 and C-4 by employing the technique shown on FIG. 4. While this variation would obviate the need to preload the pivot joint J with spring washers 681, shown in FIG. 10, and also preclude the need to equip the retractor with a slip ring commutator, as previously described, it is not recommended for aesthetic and practical reasons.

Referring again to FIG. 2, it must be understood that each relay 8 is a commercial item equipped with six special cams 81, 82, 83, 84, 85, and 86 which are cut to the general configurations shown on the drawing. It must also be understood that the cams are all oriented with respect to each other as shown, and that each cam is axially fixed to others adjacent to it. Thus, all the cams will be rotated about their common axis as a single body whenever the coil 88 is pulse energized by the interrupter springs 87 associated with the coil. It will further be understood that each of the cams 81 through 86 acts as a circuit controller and that the cams rotate counterclockwise in synchronism as the winding 88 is energized thereby alternatively opening and closing their associated leaf springs according to the individual contours of the cam surfaces.

Suffice it here to note that the pulse energy of the coil 88 is transmitted to the cams by a ratcheting mechanism, which is not shown on FIG. 2 because it is a standard and integral part of the basic relay. Suffice it also to note that the said ratchet mechanism is designed to hold the cams at a given position whenever the interrupter springs 87, and thus the coil 88, are deenergized.

As an aid to better understanding the operation of the system, certain key points on the aforesaid cams are denoted on FIG. 2 by the letters $a$, $x$, $b$, $y$, $c$, $d$, and $e$.

Assuming that all of the relay switches, 810 through 860, are arranged to lie in a common plane which parallels the axis of cam rotation, it will be apparent that a particular setting of the relay as a whole may be referred to by further assuming that the cams will be rotated as a body to that position wherein the point named, as noted above, will rest under the spring loaded lifting fingers F of the related switch contact arms, 811 through 861. Each switch will then be either opened or closed as a function of the related finger following the configuration of the related cam, as shown on the drawing.

More specifically, it should be understood that points $x$ and $y$ are simply passing switching points whereas points $a$, $b$, $c$, $d$, and $e$ are normal stopping points or positions, for the relay. As will be explained later, when the relay arrives at any one of these latter positions, some action must be taken by the occupant of the related seat space in order to step the relay away from the position named. Although this may at first appear to present some difficulty to be, it will be seen that the whole operation is arranged to follow the normal sequence of events practiced in operating a motor vehicle. Moreover, it will be seen that other than requiring the occupants of the controlled seat stations to fasten and unfasten their seat belts at the proper times, the system performs all other functions automatically.

In previewing the operation of the system it is essential to note that the seat control relays 8 have the general capability to run through one complete cycle in approximately 500 milli-seconds. Thus, assuming that the cams are cut as generally shown in FIG. 2, it will be apparent that the master control relay 3 must have the capability to open the main disconnect switch 30 in something less than 150 milli-seconds; otherwise this relay will serve no useful purpose.

While the operating speeds noted above would seemingly render the system fool-proof, it will be evident that unless each seat station is equipped with an auxiliary seat switch 52, the main disconnect switch 30 could be inadvertently opened, if one of the main seat switches were momentarily unloaded as the result of an occupant shifting his posture about the confines of his seat belts. As it is, the auxiliary seat swtiches will preclude this unwanted event, without jeopardizing the integrity of the system, provided, of course, that both the main and auxiliary seat switches are properly located and well suited to the application. More specifically, each main seat switch 51 should be buried in the bottom seat cushion at a point three to five inches forward of the back cushion face, on the center plane of the intended seat space. Similarly, each auxiliary seat switch 52 should be buried in the back support cushion at a point three to five inches below the top of the cushion, on the center plane of the intended seat space.

Finally, it will be beneficial to note that the sole function of the master relay 3 is to thwart any attempt made to defeat the system by fastening one or more of the aforesaid interlocking belt assemblies 6 prior to occupying the vehicle. More specifically, unless such an attempt is made to defeat the system, the relay 3 will never be operated and the main disconnect switch 30 will never be opened. Obviously then, all normal control functions must be performed by the standardized control units 4 installed at the seat stations. The details follow.

As shown on FIGS. 1 and 2 the ignition switch 2 is "off" and the main disconnect switch 30 is closed. All controlled seat stations are unoccupied, and the related seat belts 6 are unfastened. Accordingly, as shown in more detail on FIG. 2, the related seat belt interlocks 7 are open, and the relays 8 have been automatically reset to position $a$ as the result of the seat switches 5 having been returned to their unloaded positions. The operation of the present invention to restore the relay 8 associated with each station to the "a" position will be more clearly understood as the description proceeds.

Under the above conditions, it will be apparent that the engine may be started by operating the starting relay, either from under the hood, or by manipulating the ignition switch 2, provided that none of the seat switches 5 are displaced from their unloaded positions, as shown on the drawing. While this capability could be easily denied by extending the lobe on cam 85 back from point $x$ to $a$ this change would necessarily have to be restricted to apply to the relay installed at the driver's seat station; otherwise the engine could not be started unless all controlled seat stations were occupied. As it is, a standardized relay may be used at all seat stations. Significant as this is for economic reasons, it also provides two other attendent advantages. Specifically, it enables a mechanic to service the engine without having to disconnect, by-pass or otherwise meddle with the seat belt interlock system. It also enables the driver to momentarily vacate the vehicle without having to shut off the engine, or having it shut down automatically.

While the "vacant seat start and run capability," noted above may first appear to defeat the basic purpose of the system, it really does not. Operationally, it is of little consequence for the following reasons: Once any controlled seat space is occupied, the related seat switch 51 will be displaced to its loaded position, whereupon the command display 9A will immediately be illuminated by lamp 91 as the result of current being passed from the source 1, 20, 30 to the said lamp through the relay switch 830 related to the closed seat switch 513. Coincidentally, current will also be passed from the source to the related relay coil 88 through relay switch 810, seat switch 511, buckle interlock contacts 71 and 73, and the interrupter springs 87. Being thus energized, the coil 88 will cause the cam body to be rotated from position $a$ to position $b$ where it will be momentarily stopped as the result of cam 81 forcing switch 810 open. As the cam body rotated through position $x$, cam 85 forced switch 850 open, thus interrupting the starting relay circuit. Concurrently, cam 86 allowed switch 860 to close, thus energizing the speed control governor and emergency warning system. It will also be observed that the situation will remain unchanged until the occupant either obeys the command to fasten seat belts or vacates the vehicle. Accordingly, it becomes quite apparent that a vehicle started prior to the occupancy of any controlled seat space cannot be operated above the speed setting of the governor until the occupant of that seat fastens his seat belt, thus deenergizing the governor and the emergency warning system. More importantly, under normal circumstances it will not be possible to even start the engine until the occupant of each controlled seat space fastens his seat belt.

On obeying the command to "fasten seat belts," the seat belt interlock plug 72 will make contact with the switch spring 73, separating it from contact with switch spring 71. This action allows current to pass from the source (1, 20, 30) to the relay coil 88 through relay switch 830, seat belt interlock contacts 72 and 73, and the interrupter springs 87. That is, assuming for the moment that the cam 830 has been rotated to position $b$, current from source 1 is applied to winding 88 virtue of the electrical connection completed between plug 72 and spring 73 and extended to winding 88 by C-3. Being thus energized, the coil 88 will cause the cams to be rotated from position $b$ to position $c$ where the relay 88 will again be momentarily stopped as the result of cam 83 forcing switch 830 open, whereupon display 9A will also be darkened. Concurrently, cams 81 and 85 will respectively allow switches 810 and 851 to close, and cam 86 forces switch 861 open. Accordingly, the starting circuit is unlocked, the governor and the emergency warning system are deenergized, and the relay 8 assumes a position awaiting further protective action.

From the foregoing it will be evident that when the relay related to each occupied control station is set at position $c$, the engine may be started, restarted and operated freely, so long as the occupants of all such stations do not unfasten their seat belts. In event that any occupant of a controlled seat space unfastens his seat belt, interlock 7 will be opened allowing switch spring 73 to make contact once again with switch spring 71. This action will cause the coil 88 to be reenergized through the circuitry extending from switch 810; thus the cams will be rotated to position $d$ where the relay will again be momentarily stopped as the result of cam 81 opening switch 810. Concurrently, cam 85 forces switch 850 open, interrupting the starting circuit again. Simultaneously, in position $d$ cams 83 and 86 respectively allow switches 830 and 860 to close. Accordingly, the command display 9A will again be illuminated by lamp 91 over a circuit including the closed contact 513 of seat switch 51. More importantly, the governor and emergency warning system will be reenergized. The significance of this varies according to whether the vehicle is stopped, or moving, as noted below.

First, it should be noted that the foregoing events will be experienced whenever any occupant prepares to vacate a controlled seat space. While the governor will serve no useful purpose under these circumstances, the emergency warning system will serve as a forewarning beacon, promoting the safety of his emergence from the vehicle. It will also be noted that when the occupant does in fact vacate his seat space, the related control unit will be automatically returned to the conditions shown on FIGS. 1 and 2. Inasmuch as the switch controlled by cam 820 is closed in all but cam position $a$, the departure of a passenger from the vehicle results in the closing of contacts 522 and 512 of the seat switches 52 and 51, respectively. More specifically, when the seat switches (51 and 52) are returned to their unloaded positions, the related relay 8 will be automatically returned to position $a$ by current being passed from the source to the coil 88 through the circuitry extending from switch 820.

Secondly, in case that the driver shrugs his seat belts so as to obtain more freedom of personal movement for maneuvering the vehicle in close quarters, the governor will insure that the maneuvers are made at slow speed, and the emergency warning system will give notice to other persons in the area that a decline in the speed of the vehicle may be expected.

Finally, in case that any occupant reverts to an old habit, and unfastens his seat belt while cruising, the vehicle will be automatically slowed to the speed setting of the governor with emergency signals flashing. Under these circumstances, the offending occupant would almost intuitively obey the command to "fasten seat belts," illuminated on the command display 9A, by lamp 91. Doing so will cause the relay coil 88 to be reenergized through the circuitry extending from contact 71-73 and switch 830; thus the cams will be rotated to position $e$ where the relay will again be momentarily stopped as the result of cam 83 opening switch 830, whereupon display 9A will again be darkened. Concurrently, the relay switches will all be reset as they were when the relay was set at position "c". This may further be understood by recognizing that the cam configurations on each of the cams 82 and 85 for positions $c$ and $e$ are identical. Accordingly, the driver may resume speed, restarting the engine if necessary.

While it is unlikely that a responsible person would unfasten his seat belt twice in the course of a single occupancy, it is entirely possible that a child or a prankster sitting in a controlled passenger seat would not adhere to the admonitions of the driver, and unfasten his seat belt several times in the course of a single trip. In event that this should occur, the relay of the given subsystem would simply be reset from position $e$ to position $b$, when the seat belts are unfastened for the second time. From this it is apparent that the relay would be recycled to position $e$ and back to $b$ and so on, on each succeeding unfastening. It is also apparent that if the seat belts were repeatedly unfastened and refastened in the course of a single occupancy, the ride would be equally jerky, unduly prolonged, and frustrating.

In view of the foregoing, it is evident that the speed control capability of the system should not be extended to the rear seat stations in any vehicle, except in special cases. Thus, unruly children can be afforded the general safety of these seat spaces without jeopardizing the safety of others. While the philosophy could be extended to leaving these seat spaces as "uncontrolled stations," there is merit in making them "starting control stations;" i.e., the occupants of these semi-controlled spaces will be generally compelled to either start out wearing their seat belts or face the realization that starting of the vehicle will be delayed until corrective action is taken. Moreover, mother will known when junior unfastens his seat belt.

Referring to FIG. 1 it will be seen that the foregoing limitations can be realized by simply not extending the governor and emergency warning system control circuit through switch 860 on each of the relays installed at the rear seat stations. Obviously, in production this would lead to equipping each of these rear stations with five cam relays patterned after the one shown on FIG. 2 except that the cam 86 and switch 860 would be eliminated.

Preparatory to proving that the system has the capability to thwart any attempt made upon it to ride on the seat belts, it is essential to recall the prerequisites previously specified for the general construction of the system. It is also essential to note that circuitry related to each seat control unit shown on FIG. 1, and more specifically in FIG. 2, is arranged to reset the seat control relay 8 to position *a* whenever the related seat switches are returned to their unloaded positions. It will be appreciated, of course, that this is exactly the same condition that exists prior to boarding of the vehicle.

Referring again to FIG. 2, it will be seen that nothing but frustration can come from fastening a set of controlled seat belts prior to occupying the related seat space. Doing so will simply cause the master control relay 3 to open the main disconnect switch 30 and place the entire system on hold, with the fouled condition display 9B being illuminated by lamp 92, and with the offending seat control relay 8 being stopped at some position between points *x* and *y*. Accordingly, it will be impossible to start the engine, or run it in excess of the governed speed, if previously started, until the fault is corrected.

Further inspection of FIG. 2 will show that the foregoing fault cannot be corrected unless the offending seat belts are unfastened, or the main seat switch 51 related to the offending belt set is displaced to its loaded position, prior to manipulating the reset switch 33. Recalling that the latter named device is located under the hood, and knowing that the offending user cannot be in two places at the same instant, it follows that a third party would be required to let all occupants of a given vehicle ride on prefastened seat belts. Because the latter contingency is, without doubt, beyond the limits of normal reason, the system stands undefeated.

It will also be observed that the system cannot be defeated by fastening the seat belts behind one's back or beneath one's body after occupying a controlled seat space, unless one is able to perform the contortions required to hold the main seat switch 51 in its loaded position while so fastening the belt sections together. Assuming, however, that one could do this, it will be seen that he must be willing to either accept the discomfiture which will result from not being able to tuck the fastened belt set back into the seat joint, or once again run the risk of tripping out the master control relay in the process of obtaining that comfort. Moreover, it will be observed that unless the offender repeats the antics of defeating the system, in reverse, prior to vacating the vehicle, someone will be required to go under the hood to reset the master control relay prior to using the vehicle again. Thus, because only a few persons have the capability to perform the tasks required to defeat the system, and because it is unlikely that any of those few would be willing to repeatedly expend the time and energy required to perform those tasks, the system stands undefeated.

Finally, it should be noted that even in the absence of the master control relay 3 and the auxiliary seat switches 52, the thwarting operation would reduce to a high speed game of chance.

We claim:

1. In a passenger safety system for vehicles, the starting of which is controlled by an electrical source through an ignition interlock having, in one state, a disabling effect upon the starter circuit and, in another state, enabling said starter circuit subsequent to a passenger fastening the seat belt buckles and actuating a seat switch upon becoming seated, said interlock comprising:

a cutout relay having a first state which places a contact thereof in connection with said source and a second state in which the connection of said contact and said source is interrupted;

a stepping switch including a winding and a plurality of circuit controllers, all of which are stepped simultaneously in response to current impulses supplied to said winding from said source; each of said controllers including in cooperation therewith a fixed contact member and a movable contact member operable from one state which completes a path for conducting current from said source to a second state in which said path is interrupted;

normally closed electrical contact means mounted on one of said buckles for energizing said stepping switch through said seat switch, one of said controllers, and said contact of said cutout relay thereby stepping said switch to open said starter and said winding energization circuits;

means operated by a second one of said controllers when said starter circuit is disabled for governing the speed of said vehicle;

and conductive plug means mounted on the other buckle aligned with said first contact means when said buckles are fastened so as to engage said first contact means; said plug means being coupled to said source through a third one of said controllers for reenergizing said stepping switch winding thereby to enable said starting circuit and disable said speed governing means.

2. The interlock set forth in claim 1 in which each of said circuit controllers is a cam, the surface of which is resiliently engaged by said movable contact member.

3. The interlock set forth in claim 2 in which said cams rotate in synchronism as said winding is energized thereby alternately making and breaking the contact between said fixed and movable contact members.

4. The interlock set forth in claim 1 in which said cams equal six in number, the fixed contact member associated with the movable contact members of three of said cams having a common connection with said contact of said cutout relay.

5. The interlock set forth in claim 1 including means controlled by said third one of said controllers for providing a visual indication in each instance where a passenger seated in the vehicle has neglected to fasten himself in.

6. The interlock set forth in claim 1 further including auxiliary passenger-actuated switch means placed within the back cushion of a vehicle seat for preventing the actuation of said cutout relay in the event an occupant shifts his posterior weight sufficiently to permit the seat switch to return to its unloaded condition.

7. The interlock set forth in claim 2 further including electrical conductors connected to said normally closed electrical contact members and mounted in supporting relationship by the web strapping anchored to said one of said buckles.

8. The interlock set forth in claim 2 further including still other electrical conductors connected to said plug means and mounted in supporting relationship by the web strapping connected to said other buckle.

9. The interlock set forth in claim 7 in which said electrical conductors are bound to the frontal faces of the web strapped to said one buckle in opposing relationship parallel to the lengthwise chord of said web.

10. The interlock set forth in claim 1 further including buckle fitting means for permanently affixing a shoulder harness to a lap buckle, and electrical conductors mounted in supporting relationship to said harness for effecting an electrical junction when the mating sections of the lap buckles are joined together.

* * * * *